(12) United States Patent
Miyake et al.

(10) Patent No.: US 7,628,175 B2
(45) Date of Patent: Dec. 8, 2009

(54) METAL BELLOWS ACCUMULATOR

(75) Inventors: Kuniaki Miyake, Fujisawa (JP); Kenji Sasaki, Kikukawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 12/223,015

(22) PCT Filed: Dec. 20, 2006

(86) PCT No.: PCT/JP2006/325325

§ 371 (c)(1),
(2), (4) Date: Jul. 18, 2008

(87) PCT Pub. No.: WO2007/083471

PCT Pub. Date: Jul. 26, 2007

(65) Prior Publication Data

US 2009/0133768 A1   May 28, 2009

(30) Foreign Application Priority Data

Jan. 19, 2006   (JP) .............................. 2006-010706

(51) Int. Cl.
*F16L 55/04* (2006.01)
(52) U.S. Cl. ........................... 138/30; 138/26; 220/720
(58) Field of Classification Search .................. 138/26, 138/30, 31; 220/720–724
See application file for complete search history.

(56) References Cited

U.S. PATENT DOCUMENTS

| | | | | |
|---|---|---|---|---|
| 4,213,545 A | * | 7/1980 | Thompson et al. ....... | 222/386.5 |
| 6,871,670 B2 | * | 3/2005 | Suzuki et al. ............. | 138/30 |
| 6,871,672 B2 | * | 3/2005 | Kurokawa et al. ........ | 138/31 |
| 7,152,931 B2 | * | 12/2006 | Suzuki et al. ............. | 303/87 |
| 2004/0055656 A1 | * | 3/2004 | Kurokawa et al. ........ | 138/30 |
| 2004/0244857 A1 | * | 12/2004 | Suzuki et al. ............. | 138/30 |

FOREIGN PATENT DOCUMENTS

| | | |
|---|---|---|
| DE | 10305000 A1 | 8/2004 |
| FR | 2703124 A1 | 9/1994 |
| JP | 3-244874 A | 10/1991 |
| JP | 10-19001 A | 1/1998 |
| JP | 11-226658 A | 8/1999 |
| JP | 2003-343501 A | 12/2003 |
| JP | 2004-108511 A | 4/2004 |
| JP | 2005-240834 A | 9/2005 |

* cited by examiner

*Primary Examiner*—Patrick F Brinson
(74) *Attorney, Agent, or Firm*—Harness, Dickey & Pierce, P.L.C.

(57) ABSTRACT

To prevent breakage by abnormal deformation when seal function of a seal section becomes ineffective to cause pressurized liquid remaining in the liquid chamber to be lost, a metallic bellows-type accumulator having a metal bellows, a bellows cap, an outer gas chamber and an inner liquid chamber, in a shell is structured to have a bellows constructed such that, when pressure in the liquid chamber (12) is further reduced after the bellows cap (31) is brought into contact with an oil port (4), surface contact sections (35) are formed on the metal bellows (3) and a curvature radius of U-shaped sections (3A) of crest portions (32) at the outer diameter side is reduced, and a curvature radius of U-shaped sections (3A) of root portions (33) at the inner diameter side is enlarged.

3 Claims, 4 Drawing Sheets

METAL BELLOWS ACCUMULATOR

CROSS REFERENCE TO RELATED APPLICATIONS

This is a national stage of the International Application No. PCT/JP2006/325325 filed on Dec. 20, 2006 and published in Japanese language.

BACKGROUND OF THE INVENTION

1. Field of the Invention

The present invention relates to a metallic bellows-type accumulator used in hydraulic piping of an automobile or the like as a pressure accumulation device or pulse pressure damping device or the like.

2. Description of the Conventional Art

The conventional metallic bellows-type accumulator 101 includes, as shown in FIG. 5(1), a shell 103 having an attachment portion 111 formed at one end to attach to a given system and having a gas plug 112 fixed at the other end to close a gas filling port for filling high pressure gas, and a metal bellows 107 capable of extending and contracting and disposed within the shell 103, one end of the metal bellows being fixedly secured to the shell 103 at the side of the attachment portion 111 and other end of the metal bellows being joined to a bellows cap 106, so that an inside of the shell 103 is partitioned into an outer gas chamber 104, in which high pressure gas is enclosed, at the side of the gas plug 112 and an inner liquid chamber 105, to and from which pressurized liquid is introduced and discharged. The metal bellows 107 has crest portions 107a at an outer diameter side and root portions 107b at an inner diameter side, each of the portions 107a and 107b having a sectional shape 107c in the axial direction in U-shape. The metal bellows 107 is configured such that, when contracted, a curvature radius Ra of U-shaped sections 107c of the crest portions 107a at the outer diameter side and a curvature radius Ra of the U-shaped sections 107c of the root portions 107b at the inner diameter side are reduced at the same rate. An oil port 108 is provided within the liquid chamber 105 for restricting the degree of contraction of the metal bellows 107, and a seal section 110 is attached to the bellows cap 106 at the side of attachment portion 111 for sealing a communication passage hole 109 provided on the upper wall 108a of the oil port 108 when the bellows cap 106 is brought into contact with the oil port 108.

With such structure, even in the case of system down and thereby the pressure in the liquid chamber 105 is reduced to cause larger contraction of the metal bellows 107, the further contraction of the metal bellows 107 is restricted by the bellows cap 106 which is in contact with the end surface of the upper wall 108a of the oil port 108. Furthermore, the seal section 110 attached to the bellows cap 106 seals the communication passage hole 109 formed on the upper wall of the oil port 108, thereby to prevent discharging of pressurized liquid from the liquid chamber 105 beyond a predetermined amount thereof. Therefore, abnormal deformation and resultant breakage of the metal bellows 107 are prevented (referring to Japanese unexamined patent publication No. 2003-343501 and Japanese unexamined patent publication No. 2004-108511).

However, in the above mentioned structure, when the metal bellows 107 is contracted to the extent of contacting with the oil port 108, the curvature radius Ra of the U-shaped sections 107c of the crest portion 107a at the outer diameter side and the curvature radius Ra of the U-shaped sections 107c of the root portion 107b at the inner diameter side are reduced at the same rate and become to be Rb, as shown in FIG. 5(2). Consequently, if a seal function of the seal section 110 becomes ineffective to cause pressurized liquid remaining in the liquid chamber 105 to be discharged, the pressure in the outer gas chamber 104 becomes higher than that of the inner liquid chamber 105, whereby abnormal deformation may occur at point or line contact portions 107d produced by the contraction of the crest portions 107a at the outer diameter side of the metal bellows 107 and the root portions 107b at the inner diameter side at the same rate, stress is thus concentrated to the contact portions 107d, and in the worst case, there may happen breakage of the metals bellows 107.

SUMMARY OF THE INVENTION

Problem to be Solved by the Invention

In view of the above-described problem, an object of the present invention is to provide such a metallic bellows-type accumulator that crest portions at the outer diameter side and root portions at the inner diameter side of a contracted metal bellows are not brought into point or line contact among themselves and thereby breakage of the accumulator due to abnormal deformation of the metal bellows is prevented, even in the case of seal section being not provided, or even in the case that a seal section is provided but seal function of the seal section happens to become ineffective, to cause pressurized liquid remaining in a liquid chamber to be discharged in the state of a bellows cap being in contact with the oil port, resulting in contraction and deformation of the metal bellows.

Means for Solving the Problem

To achieve the above object, the metallic bellows-type accumulator according to a first aspect of the present invention comprises a shell having an attachment portion formed at one end to attach to a given system and having a gas plug fixed at the other end to close a gas filling port for filling high pressure gas, a metal bellows capable of extending and contracting and disposed within the shell, one end of the metal bellows being fixedly secured to the shell at the side of the attachment portion and other end of the metal bellows being joined to a bellows cap, so that an inside of the shell is partitioned into an outer gas chamber, in which high pressure gas is enclosed, at the side of the gas plug and an inner liquid chamber, to and from which pressurized liquid is introduced and discharged, the metal bellows having crest portions at an outer diameter side and root portions at an inner diameter side, each of the portions having a sectional shape in the axial direction in U-shape, and an oil port disposed within the liquid chamber to restrict the degree of contraction of the metal bellows, wherein the metallic bellows-type accumulator is characterized in that the metal bellows is configured such that, when pressure in the liquid chamber is further reduced after the bellows cap is brought into contact with the oil port, contact surfaces are formed on the metal bellows and a curvature radius of U-shaped sections of the crest portions at the outer diameter side is reduced to form hair-pin shaped sections, and a curvature radius of U-shaped sections of the root portions at the inner diameter side is enlarged.

Effects of the Invention

The present invention has the following advantageous effects.

According to the metallic bellows-type accumulator of the present invention with the above structure, even in the case of a seal section being not provided, or even in the case that a seal section is provided but seal function of the seal section happens to become ineffective to cause pressurized liquid remaining in the liquid chamber to be discharged in the state of the bellows cap being in contact with the oil port, whereby pressure of the liquid chamber is lowered, contraction movement of the metal bellows in a longitudinal direction is limited due to the bellows cap being brought into contact with the oil port. However, when the pressurized liquid further flows out so that the pressure in the outer gas chamber becomes higher than that in the inner liquid chamber, the metal bellows is contracted and deformed. Even when such the contraction and deformation of the metal bellows occur, surface contact portions are formed between the crest portions at the outer diameter side and the root portions at the inner diameter side, thereby to prevent stress concentration to the contact sections, and it becomes possible to prevent breakage of the metal bellows. Furthermore, since the curvature radius of the U-shaped sections of the crest portions at the outer diameter side is reduced to form hair-pin shaped sections, and the curvature radius of the U-shaped sections of the root portions at the inner diameter side is enlarged, it becomes possible to maintain the durability of the metal bellows.

DETAILED DESCRIPTION OF PREFERRED EMBODIMENT

A preferred embodiment of the present invention will now be described with reference to the drawings.

Figure 1:
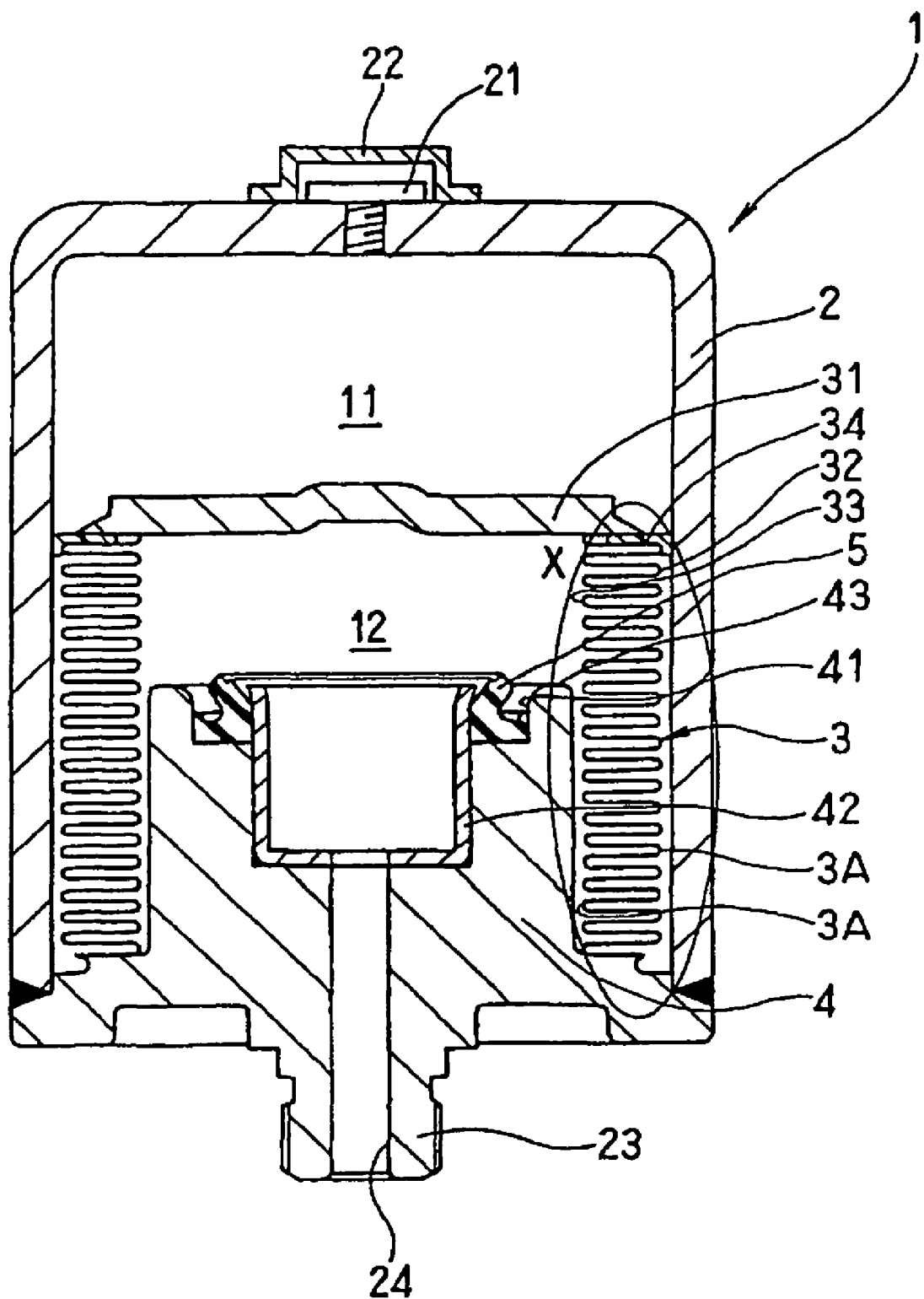
FIG. 1 is a sectional view of a metallic bellows-type accumulator according to the present invention, FIG. 2 (1) is an enlarged explanatory sectional view of a portion indicated by X in FIG. 1 in a normal state, FIG. 2(2) is an enlarged explanatory sectional view of a portion indicated by X1 in FIG. 2(1), FIG. 3(1) is an enlarged explanatory sectional view of the portion indicated by X in FIG. 1 in a contraction state, FIG. 3(2) is an enlarged explanatory sectional view of a portion indicated by Y1 in FIG. 3(1), FIG. 4(1) is an explanatory view of the metal bellows in a contraction state of the present embodiment, FIG. 4(2) is an enlarged explanatory sectional view of a portion indicated by Y2 in FIG. 4(1), FIG. 5(1) is an explanatory view of a metal bellows in a contraction state of the conventional art, and FIG. 5(2) is an enlarged explanatory sectional view of a portion indicated by Z in FIG. 5(1).

A metallic bellows-type accumulator 1 according to the embodiment of the present invention is provided with a shell 2, a metal bellows 3, an oil port 4, and a seal section 5, as shown in FIG. 1.

There is provided at one end of the shell 2 an attachment portion 23 to attach to a given system not shown, and a pressurized liquid inlet 24 is formed at an inner periphery side thereof to introduce pressurized liquid at the side of the system into a liquid chamber 12 which will be described later. There are provided at the other end of the shell 2 a gas plug 21, which is securely fixed by P/J welding or the like in an filling port after a gas chamber 11 described later is filled with pressurized gas through the filling port, and a hexagonal nut 22 which is used for securing the metallic bellows-type accumulator 1 to the system and is attached to the shell 2 so as to cover the gas plug 21.

The metal bellows 3 is configured to be extending and contracting and disposed within the shell 2. One end of the metal bellows 3 is fixedly secured by welding to the oil port 4, which will be described later, at the side of the attachment portion 23, and other end of the metal bellows 3 is joined by welding to a movable bellows cap 31. An inner space of the shell 2 is partitioned by the metal bellows 3 into a gas chamber 11, in which high pressure gas is filled, at the outside of the metal bellows 3 and at the side of the gas plug 21, and a liquid chamber 12, to and from which pressurized liquid is introduced and discharged, at the inside of the metal bellows 3.

Figure 2:
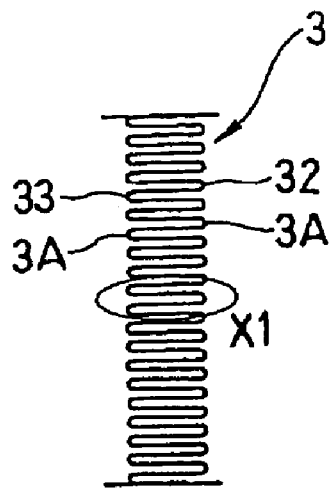
Figure 2:
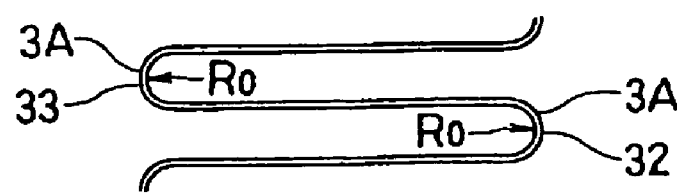
Figure 3:
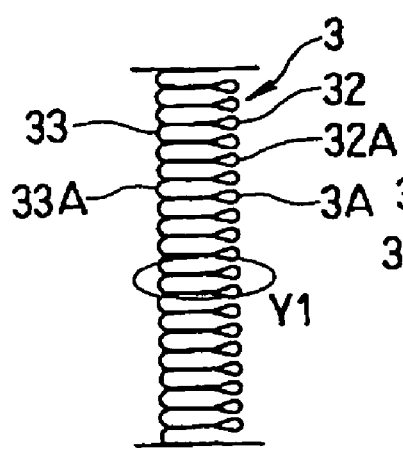
Figure 3:
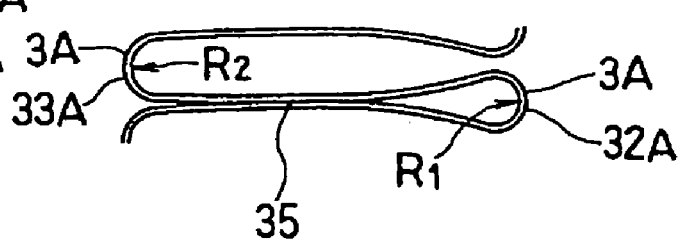

The metal bellows 3 has crest portions 32 at an outer diameter side and root portions 33 at an inner diameter side, each of which has a sectional shape in the axial direction in U-shape, and curvature radiuses of U-shaped sections 3A of the portions 32 and 33 are identically $R_0$ in a normal state as shown in FIGS. 2(1) and 2(2). When the bellow cap 31 is brought into contact with the oil port 4 and then pressurized liquid remaining in the liquid chamber 12 flows out, the metal bellows 3 is deformed such that the curvature radiuses of the U-shaped sections 3A of the crest portions 32 at an outer diameter side and root portions 33 at an inner diameter side become different, as shown in FIGS. 3(1) and 3(2). More specifically, when the pressure in the liquid chamber 12 comes down, surface contact portions 35 are formed between crest portions 32 at the outer diameter side and root portions 33 at the inner diameter side of the metal bellows 3, and the curvature radius $R_0$ of the U-shaped sections 3A of the crest portions 32 at the outer diameter side is reduced to $R_1$ to form hair-pin shaped sections 32A. Further, the curvature radius $R_0$ of the U-shaped sections 3A of the root portions 33 at the inner diameter side is enlarged to $R_2$ to form enlarged U-shaped sections 33A. Further, in order to make the curvature radius of the U-shape sections 3A different between the crest portions 32 at the outer diameter side and root portions 33 at the inner diameter side as described above when the metal bellows 3 is contracted, it is a usual way to make rigidity different between the crest portions 32 at the outer diameter side and root portions 33 at the inner diameter side of the metal bellows 3, or to make wall thickness of the metal bellows to satisfy the relation of t1<t2 or t1>t2, where the wall thickness of the crest portions 32 at the outer diameter side is t1 and the wall thickness of the root portions 33 at the inner diameter side is t2. However, ways of making the curvature radius of the U-shape sections 3A different is not limited to the above ways, but any possible way may be used.

Further, there is provided a damping ring 34 on the other end of the metal bellows 3 at its outer periphery side, where the metal bellows 3 is connected with the bellows cap 31. The damping ring 34 is provided slidingly in contact with the inner peripheral surface of the shell 2 to prevent the metal bellows 3 from winding its way and scratching the inner peripheral of the shell 2 when the metal bellows 3 is contracted. The bellows cap 31 and metal bellows 3 may be formed separately from each other, or formed integrally. Further, high pressure gas which is to be enclosed in the gas chamber 11 may not only be a single gaseous matter but also include a proper quantity of volume-adjusting liquid.

An oil port 4 is disposed within the metal bellows 3 at the side of the attachment portion 23. One end of the oil port 4 is connected with the shell 2 by welding, and the other end of the oil port 4 has a recess portion 41 formed at the side of the gas plug 21. A seal holder 42 formed as a cup-shaped metal fitting is fixedly secured to the oil port 4 at the side facing the gas plug 21 and at the inner periphery side of the recess portion 41 by means of welding, caulking, press-fitting or the like. A stopper 43 is provided on the oil port 4 at the side facing the gas plug 21 to contact with the bellows cap 31 to thereby stop the movement of it when the metal bellows 3 is contracted during operation of the accumulator 1. The seal holder 42 is configured to have an inner space constituting a chamber for damping pulsation of pressurized liquid flow.

A seal section 5 is a self-seal type one having a lip portion made of a rubbery elastic body, which is attached to the recess portion 41 by a mechanical fixing means such as press-fitting at the outer periphery side of the seal holder 42, thereby to seal the boundary with the bellows cap 31 and to prevent over adhesion of the metal bellows 3 when the bellows cap 31 is lowered (downward direction in the drawing) to be in contact with the stopper 43.

Figure 4:
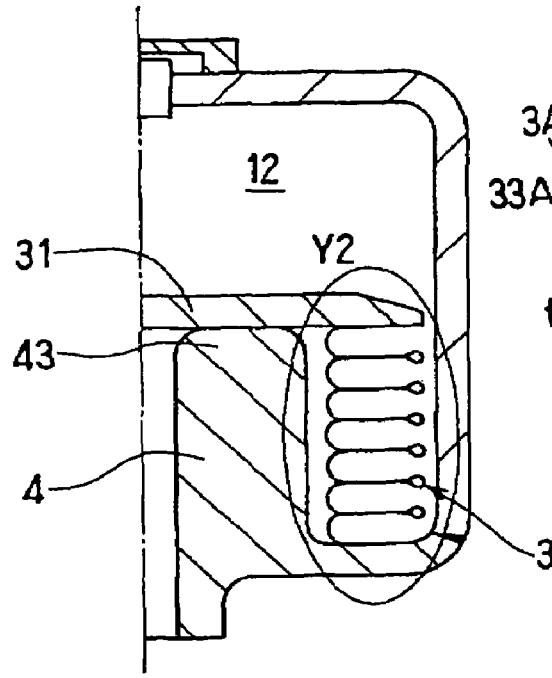
Figure 4:
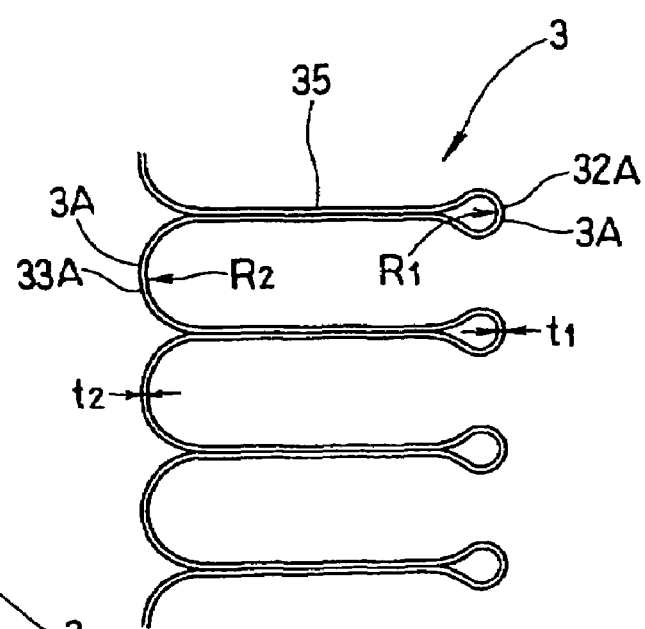
Figure 5:
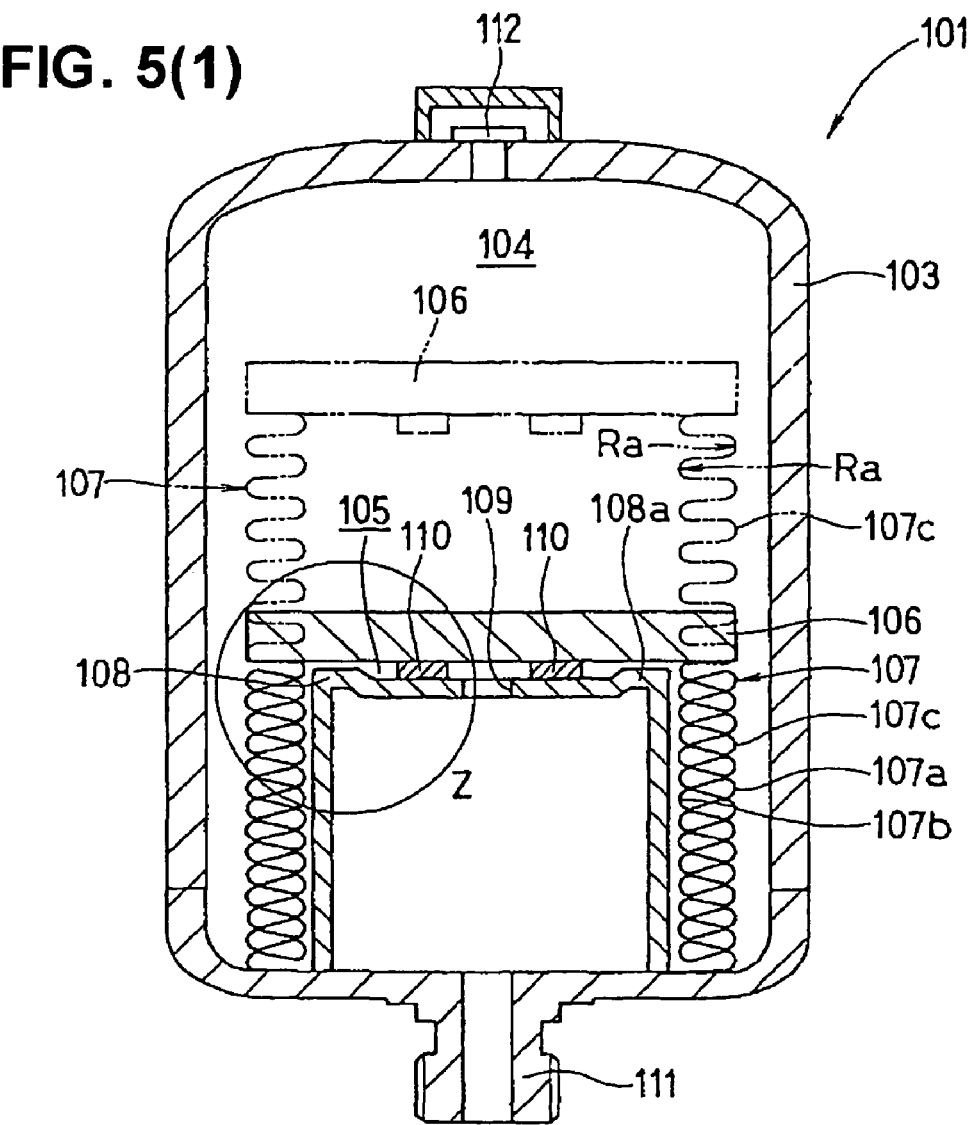
Figure 5:
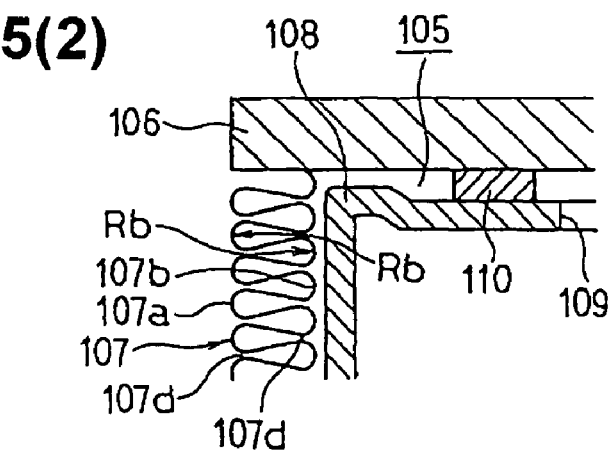

In the metallic bellows-type accumulator 1 with the above described structure, when the metal bellows 3 is contracted and deformed due to lowering of pressure in the liquid chamber 12 until the bellows cap 31 is in contact with the stopper 43 of the oil port 4, surface contact portions 35 are formed between the crest portions 32 at the outer diameter side and the root portions 33 at the inner diameter side as shown in FIGS. 4(1) and 4(2), and the curvature radius $R_0$ of the U-shaped portions 3A of the crest portions 32 at the outer diameter side is reduced to $R_1$ to form hair-pin shaped sections 32A, while the crest portions 32 at the outer diameter side are not in contact with each other. Further, contrary to the crest portions 32 at the outer diameter side, the curvature radius $R_0$ of the U-shaped portions 3A of the root portions 33 at the inner diameter side is enlarged to $R_2$ to form enlarged U-shaped sections 33A.

Therefore, even in the case of the seal section being not provided, or even in the case that the seal section 5 is provided but seal function of the seal section 5 happens to become ineffective to cause pressurized liquid remaining in the liquid chamber 12 to be discharged in the state of the bellows cap 31 being in contact with the oil port 4, the contraction of the metal bellows 3 in a longitudinal direction is limited due to the metal bellows 3 being brought into contact with the stopper 43 of the oil port 4. Further, even when the pressure in the outer gas chamber 11 becomes higher than that in the inner liquid chamber 12 due to flow out of pressurized liquid so that the metal bellows 3 is contracted and deformed, surface contact portions 35 are formed between the crest portions 32 at the outer diameter side and the root portions 33 at the inner diameter side, thereby to prevent stress concentration to the surface contact portions 35, and it becomes possible to prevent breakage of the metal bellows 3. Furthermore, since the curvature radius $R_0$ of the U-shaped portions 3A of the crest portions 32 at the outer diameter side is reduced to $R_1$ to form hair-pin shaped sections 32A, and the curvature radius $R_0$ of the U-shaped portions 3A of the root portions at the inner diameter side is enlarged to $R_2$ to form enlarged U-shaped sections 33A, it becomes possible to maintain the durability in operation of the metal bellows 3.

What is claimed is:

1. A metallic bellows-type accumulator comprising:
a shell having an attachment portion formed at one end to attach to a given system and having a gas plug fixed at another end to close a gas filling port for filling high pressure gas;
a metal bellows capable of extending and contracting and disposed within the shell, one end of the metal bellows being fixedly secured to the shell at the side of the attachment portion and another end of the metal bellows being joined to a bellows cap, so that an inside of the shell is partitioned into an outer gas chamber, in which high pressure gas is enclosed, at a side of the gas plug and an inner liquid chamber, to and from which pressurized liquid is introduced and discharged, said metal bellows having crest portions at an outer diameter side and root portions at an inner diameter side, each of the crest and root portions and having a sectional shape in an axial direction of a U-shape; and
an oil port disposed within the liquid chamber to restrict a degree of contraction of the metal bellows; wherein
said metal bellows is configured such that, when pressure in the liquid chamber is further reduced after the bellows cap is brought into contact with the oil port, contact surfaces are formed on the metal bellows and a curvature radius of the crest portions at the outer diameter side is reduced from the U-shape to form hair-pin shaped sections, and a curvature radius of the root portions at the inner diameter side is enlarged from the U-shape;
wherein the hair-pin shaped sections include the contact surfaces which are formed between the crest portions at the outer diameter side and the root portions at the inner diameter side, and the crest portions at the outer diameter side which are spaced apart from each other.

2. A metallic bellows-type accumulator comprising:
a shell having an attachment portion formed at one end to attach to a given system and having a gas plug fixed at another end to close a gas filling port for filling high pressure gas;
a metal bellows which is capable of extending and contracting, and disposed within the shell, one end of the metal bellows being fixedly secured to the shell at the side of the attachment portion and another end of the metal bellows being joined to a bellows cap, so that an inside of the shell is partitioned into an outer gas chamber, in which high pressure gas is enclosed, at the side of the gas plug and an inner liquid chamber, to and from which pressurized liquid is introduced and discharged; and
an oil port disposed within the liquid chamber to restrict a degree of contraction of the metal bellows;
wherein when the metal bellows contracts, said metal bellows includes surface contact portions between crest portions at the outer diameter side and root portions at the inner diameter side that are brought into surface contact with one another so that a hair-pin shape is formed by sections of portions from said surface contact portions to said crest portions at the outer diameter side, and the crest portions at the outer diameter side are spaced apart from each other.

3. A metallic bellows-type accumulator comprising:
a shell; and
a bellows which is capable of extending and contracting and partitions an inside of the shell into a gas chamber and liquid chamber,
wherein said bellows has surface contact portions between crest portions at an outer diameter side and root portions at an inner diameter side; and
wherein, when the bellows contracts, the surface contact portions are brought into surface contact so that sections of portions from said surface contact portions to said crest portions at the outer diameter side form a hair-pin shape, and the crest portions at the outer diameter side are spaced apart from each other.

* * * * *